United States Patent [19]

Nassivera

[11] Patent Number: 5,276,554
[45] Date of Patent: Jan. 4, 1994

[54] MAGNIFICATION ADJUSTMENT SYSTEM FOR A VARIABLE POWER RIFLE SCOPE

[76] Inventor: Theodore S. Nassivera, R.R. 1, Box 1976, Fort Edward, N.Y. 12828

[21] Appl. No.: 952,307

[22] Filed: Sep. 28, 1992

[51] Int. Cl.⁵ ............................................. F41G 1/38
[52] U.S. Cl. .................................. 359/694; 359/826; 33/246; 42/101
[58] Field of Search .............. 359/425, 426, 427, 428, 359/429, 365, 383, 384, 822, 826, 694; 356/150, 151, 153, 250, 251, 252; 33/245, 246; 42/101

[56] References Cited

U.S. PATENT DOCUMENTS

| | | |
|---|---|---|
| 2,454,686 | 11/1948 | Back . |
| 3,418,032 | 12/1968 | Kajiro . |
| 3,506,330 | 4/1970 | Allen . |
| 4,094,587 | 6/1978 | Besenmatter et al. . |
| 4,472,033 | 9/1984 | Fukuhara et al. . |
| 4,618,221 | 10/1986 | Thomas .......................... 359/428 |
| 4,626,077 | 12/1986 | Yamamoto . |
| 4,749,268 | 6/1988 | Moskovich et al. . |
| 4,802,717 | 2/1989 | Kebo . |
| 4,841,659 | 6/1989 | Williams .......................... 42/101 |
| 4,844,586 | 7/1989 | Suzuki et al. . |
| 4,899,450 | 2/1990 | Huggins .......................... 42/101 |
| 4,952,041 | 8/1990 | Sandall . |
| 5,026,158 | 6/1991 | Golubic .......................... 356/252 |
| 5,180,875 | 1/1993 | Berry, Jr. et al. .......................... 42/101 |

*Primary Examiner*—Edward K. Look
*Assistant Examiner*—Christopher Verdier
*Attorney, Agent, or Firm*—Schmeiser, Morelle & Watts

[57] ABSTRACT

A thumb actuated system for adjusting the magnification of a variable power (zoom) scope mounted on a rifle without removing the rifle from the shooting position. The magnification adjustment system, which is removably securable to the ocular end of the scope housing proximate the rotatably adjustable zoom lens arrangement, includes a multipositional lever assembly which may be easily manipulated by the thumb of a shooter's trigger hand while in the shooting position, a gearing system for producing a rotational force in response to the thumb actuated movement of the multipositional lever assembly and a belt system for applying the rotational force provided by the gearing system to the rotatably adjustable zoom lens arrangement, thereby adjusting the magnification of the variable power scope.

10 Claims, 4 Drawing Sheets

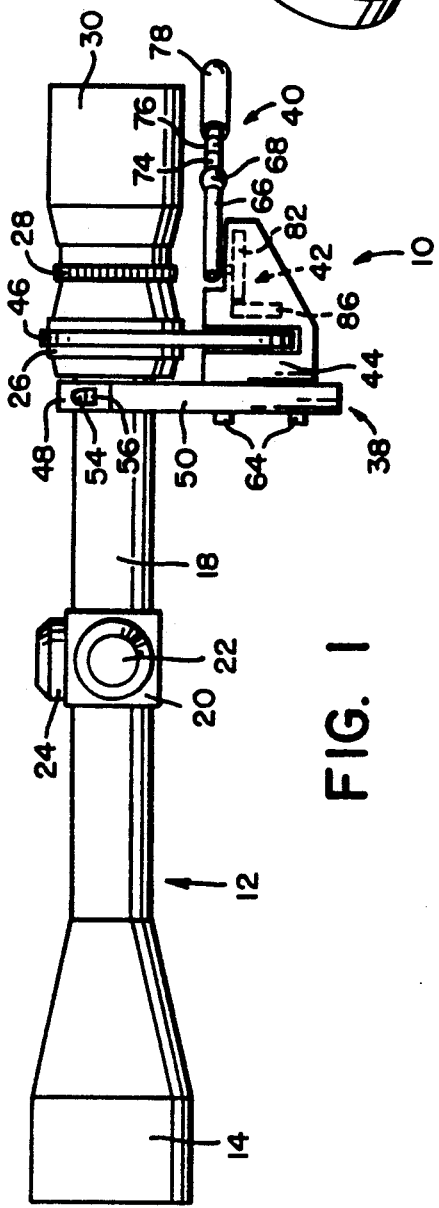
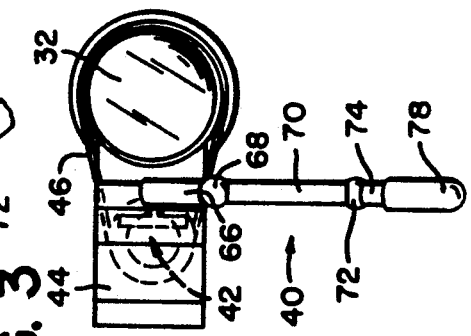
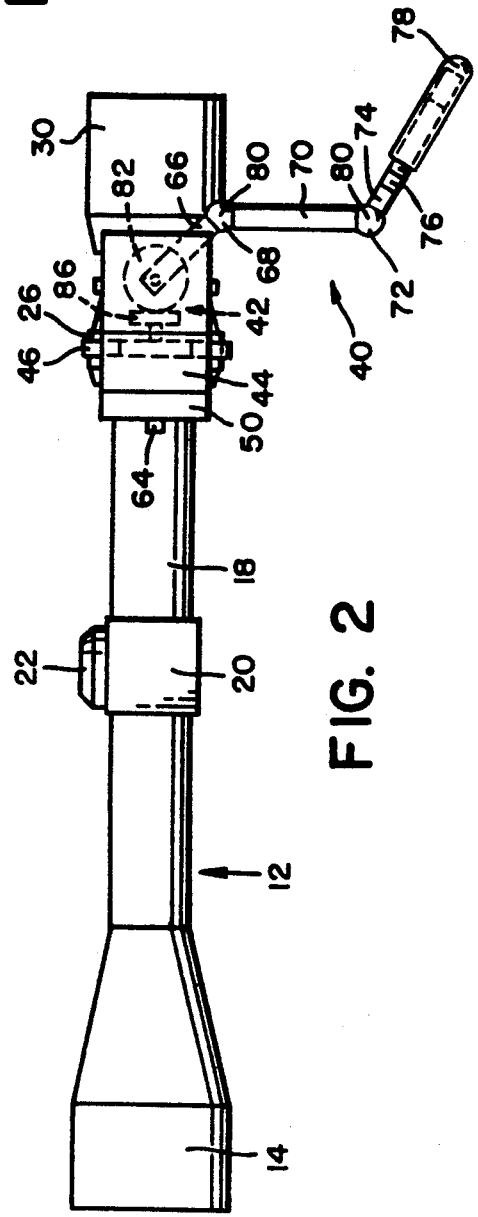

MAGNIFICATION ADJUSTMENT SYSTEM FOR A VARIABLE POWER RIFLE SCOPE

FIELD OF THE INVENTION

The present invention relates to a telescopic gunsight for a rifle and, more particularly, to an apparatus for manually adjusting the magnification of a variable power (zoom) telescopic gunsight while holding the rifle in a shooting position.

BACKGROUND OF THE INVENTION

A telescopic gunsight, hereafter referred to as a scope, is essentially a telescope containing an aiming reference point (reticle), for mounting on a rifle. The magnification provided by a scope generally offers many advantages over the iron sights found on most rifles. For example, a scope can increase the visibility of a distant animal or target and/or assist in the identification and location of game. Often, an animal that would ordinarily go unnoticed in protective cover stands out more clearly when viewed through a scope. Similarly, while deer hunting, a distant deer may appear as a buck or a doe through iron sights; with a scope, a hunter can more easily identify the sex of the deer and even determine the size of the buck's rack. A scope may also add a margin of safety to hunting by reducing the number of accidental shootings. What may look like a deer, bear or other animal with the naked eye may well turn out to be a camouflaged hunter when viewed through a scope. A scope may also serve as an aid to failing eyesight. For example, older hunters or shooters with reduced eye accommodation generally have difficulty with iron sights when trying to simultaneously focus the rear sight, the front sight and the target, which are all located at different distances from the eye. With a scope, this difficulty disappears because the image of a target or game is placed directly on the reticle. Consequently, when the shooter's eye is focused on the reticle, it is also focused on the target.

The primary function of a scope is to make a distant object look closer by making it appear larger. This function is achieved by the relative arrangement of the various lenses within the housing of the scope. Typically, rifle scopes are available in a wide variety of fixed powers ranging from approximately 1.5x to 30x or greater and with variable powers offering a broad range of magnifications including 1½x to 6x, 3x to 9x, 6x to 24x and others. Although fixed power scopes are generally smaller, lighter and less expensive than variable power scopes, they are not as versatile and are limited in their application. In particular, the field of view (the width of the area visible through the scope) provided by a fixed power scope may not be appropriate for different types of hunting or shooting. For example, while the narrow field of view and greater magnification provided by a high power scope may be sufficient and desirable for target shooting or for long range hunting of stationary game, it is generally unsuitable for quick shots at a moving target or animal. Conversely, while the wider field of view provided by a lower power scope is highly important for close shooting or for running shots because it allows a target to be more easily tracked through the scope, the magnification provided by the lower power scope may not be appropriate for long range hunting or for competitive target shooting. Thus, a shooter must make a tradeoff between magnification and field of view when purchasing a fixed power scope.

A variable power scope avoids the above-described disadvantages of fixed power scopes by providing an adjustable range of magnification and an adjustable field of view. A variable power scope typically includes an elongated housing (main tube) containing a collective lens, an erector lens and an adjustable reticle, an ocular lens arrangement (eyepiece) located at the end of the housing nearest the shooter's eye, an objective lens arrangement located at the end of the housing closest to the muzzle of the rifle and a rotatably adjustable zoom lens arrangement located proximate the eyepiece or integral therewith. The magnification of a variable power scope may be quickly adjusted by manually rotating an element such as a ring or sleeve located about the perimeter of the zoom lens arrangement.

Correct hand positioning is essential for the proper support and immobilization of a rifle while aiming and/or shooting at a target. This is particularly true for rifles with scopes mounted thereon because the magnification provided by the scope increases the apparent tremors of the sight picture. For example, when holding a scope mounted rifle in the right handed shooting position, a shooter typically supports and stabilizes the forearm of the rifle with the left hand, tucks the butt of the rifle into the pocket of the right shoulder, grasps the pistol grip of the rifle with the right hand and positions the right eye according to the eye relief of the scope. In this position, the stock and forearm of the rifle are primarily supported by the fingers and palms of the right and left hands, respectively. In general, the index finger of the right hand is placed on or near the trigger of the rifle the middle, ring and pinkie fingers are secured around the underside of the pistol grip and the thumb is wrapped thereover. Similarly, the fingers of the left hand are commonly wrapped around the forearm of the rifle with the palm facing upwards. Unfortunately, in order to adjust the magnification of currently available variable power rifle scopes, a shooter must remove the rifle and/or one or both hands from the shooting position prior to any manual manipulation of the rotating element on the zoom lens arrangement, thereby resulting in the potential loss of a previously sighted target or animal from within the field of view of the scope and the possible forfeiture of a shooting opportunity.

A powered zoom rifle scope which utilizes a thumb operated switch located on the upper surface of the eyepiece to control a motorized zoom lens assembly has recently been developed in an attempt to overcome the above-described problem. Although it is an object of this scope to allow for the thumb actuated adjustment of the zoom lens assembly while maintaining a shooting finger on the trigger of the rifle, the location of the thumb manipulated switch requires the shooter to remove the thumb and palm of the trigger hand from their shooting position on the pistol grip of the rifle and to maneuver the trigger hand into a very unnatural and uncomfortable position. Consequently, the rifle may be prone to significant movement during the magnification adjustment of the zoom lens assembly, thereby resulting in the potential loss of a target from within the field of view of the scope. More importantly, however, the rotational movement of the trigger hand that is required to correctly position the thumb on the eyepiece switch tends to force the trigger finger of the shooter against the trigger of the rifle, possibly resulting in an accidental firing of the rifle.

SUMMARY OF THE INVENTION

In order to avoid the disadvantages of the prior art, the present invention utilizes a thumb actuated system for adjusting the magnification of a variable power scope mounted on a rifle while holding the rifle in the shooting position, thereby allowing a shooter to safely and easily adjust the magnification of the scope without losing a potential target from within the field of view.

The magnification adjustment system of the present invention includes an adjustable clamp for securing the system to a section of a variable power scope proximate the rotatably adjustable zoom lens arrangement, a multipositional lever assembly for receiving the thumb of a shooter's trigger hand while the rifle is held in a shooting position, a gearing system for converting the thumb actuated movement of the multipositional lever into a rotational force, and a belt system for applying the rotational force provided by the gearing system to the rotatably adjustable zoom lens arrangement.

The adjustable clamp of the present invention enables the magnification adjustment system to be easily retrofitted onto the vast majority of commonly available variable power scopes. In the preferred embodiment of the invention, the adjustable clamp includes a two piece clamping plate having first and second sections which are mutually securable about opposing sides of the main tube or other appropriate area of a variable power scope. The first section of the clamping plate includes a plurality of apertures for receiving clamping members such as screws, bolts or the like, and a concavity adapted to be fitted about a first side of the scope. Similarly, the second section of the clamping plate includes a corresponding plurality of openings for accommodating the clamping members after they have been inserted through the apertures in the first section, a concavity adapted to be fitted about a second side of the scope opposite the first section of the clamping plate and an elongated channel for adjustably receiving the housing of the gearing system. In addition, the inner surfaces of the concavities on the first and second clamping sections may be covered with a protective material such as rubber, plastic or the like to prevent the scope from being scratched or damaged by the adjustable clamp.

The multipositional lever assembly of the present invention includes a plurality of lever sections connected by at least one pivotally adjustable ball joint, although many other lever configurations may be utilized. In the preferred embodiment, the multipositional lever assembly comprises a first lever section which is operatively connected to the gearing system of the present invention, a second lever section pivotally attached to the first lever section by a first ball joint and a second ball joint for pivotally attaching the second lever section to a third length adjustable lever section having a threaded end portion for receiving a rotatable thumb receiving element, wherein the overall length of the third lever section may be altered by rotating the thumb receiving element about the threaded end portion. In addition, the third lever section may be covered with a material such as rubber or the like, may include a flattened end portion and/or may include a suitably shaped depression for receiving the thumb of a shooter, in order to facilitate the thumb actuated operation of the multipositional lever assembly.

The first and second ball joints allow the various lever sections to be adjustably positioned according to the shooting position of the thumb of a shooter's trigger hand. After the lever sections have been suitably arranged, each of the ball joints may be securely fastened into position with a corresponding locking screw or the like, thereby forming a single rigid lever assembly.

The unique design of the multipositional lever assembly enables the thumb actuated magnification adjustment system of the present invention to be operated while the rifle is held in the right or left handed shooting positions. For example, for the right handed shooting position, the lever sections may be manipulated in order to position the thumb receiving element proximate the top left section of the rifle's pistol grip, in a location corresponding to the shooting position of the thumb of the right hand. Similarly, for the left handed shooting position, the lever sections may be maneuvered over the top of the rifle, thereby positioning the thumb receiving element adjacent the top right section of the rifle's pistol grip, in a location coinciding with the shooting position of the thumb of the left hand.

The gearing system of the present invention utilizes a perpendicularly oriented combination of a first rotatable gear member and a second rotatable gear/pulley member in order to convert the thumb actuated movement of the multipositional lever assembly into a rotational force. The first gear member, which is securable to or formed integral with the first lever section, is adapted to rotate about an axis substantially perpendicular to the longitudinal axis of a corresponding scope in response to the movement of the multipositional lever assembly. In addition, the first gear member includes a plurality of teeth which are designed to engage the teeth on the second gear/pulley member thereby rotating the second/pulley gear member and a belt system attached thereto about an axis substantially parallel to the longitudinal axis of the scope.

The gearing system of the present invention is enclosed within a protective housing which may be adjustably secured to the second section of the clamping plate. In particular, the housing includes a plurality of mounting bolts which are adapted to be inserted through the elongated channel in the second section of the clamping plate and secured thereto with appropriate connecting hardware. The position of the gearing system housing relative to an attached scope may be adjusted as needed by moving the housing within the elongated channel, thereby enabling the present invention to be retrofitted onto many different variable power scope configurations.

The rotational force provided by the rotation of the second gear/pulley member is directly coupled to the rotatably adjustable zoom lens arrangement on the variable power scope with a belt system. In the preferred embodiment of the invention, a belt composed of rubber, plastic or other suitable material and including a plurality of striations on the inner side thereof is adapted to encircle the combination of the second gear/pulley member and the rotatably adjustable zoom lens arrangement, thereby engaging opposing arcuate sections thereof. The belt may be formed as a single continuous unit, or may include one or more pieces which may be adjustably secured about the second gear/pulley member and the rotatably adjustable zoom lens arrangement with an appropriate number of fastening elements.

In an alternate embodiment of the present invention, the multipositional lever assembly may be secured directly to a circular clamp which is adapted to tightly encircle the rotatably adjustably zoom lens arrangement on the variable power scope. In this embodiment, the thumb actuated lateral movement of the lever assembly produces a rotation of the zoom lens arrangement, thereby resulting in an adjustment of the magnification provided by the scope. As in the preferred embodiment of the invention, the multipositional lever assembly is designed to receive the thumb of a shooter while the rifle is held in the shooting position.

BRIEF DESCRIPTION OF THE DRAWINGS

FIG. 1 is a plan view of the variable power scope arrangement according to the preferred embodiment of the invention;

FIG. 2 is a side view of the variable power scope arrangement;

FIG. 3 is an end view of the variable power scope arrangement taken from the ocular end of the scope;

FIG. 5 is a partial cut-away view of a gearing system for converting the linear motion of the thumb actuated lever into a rotational force and the belt system for applying the rotational force to the rotatably adjustable zoom lens arrangement;

DETAILED DESCRIPTION OF THE INVENTION

Figure 4:
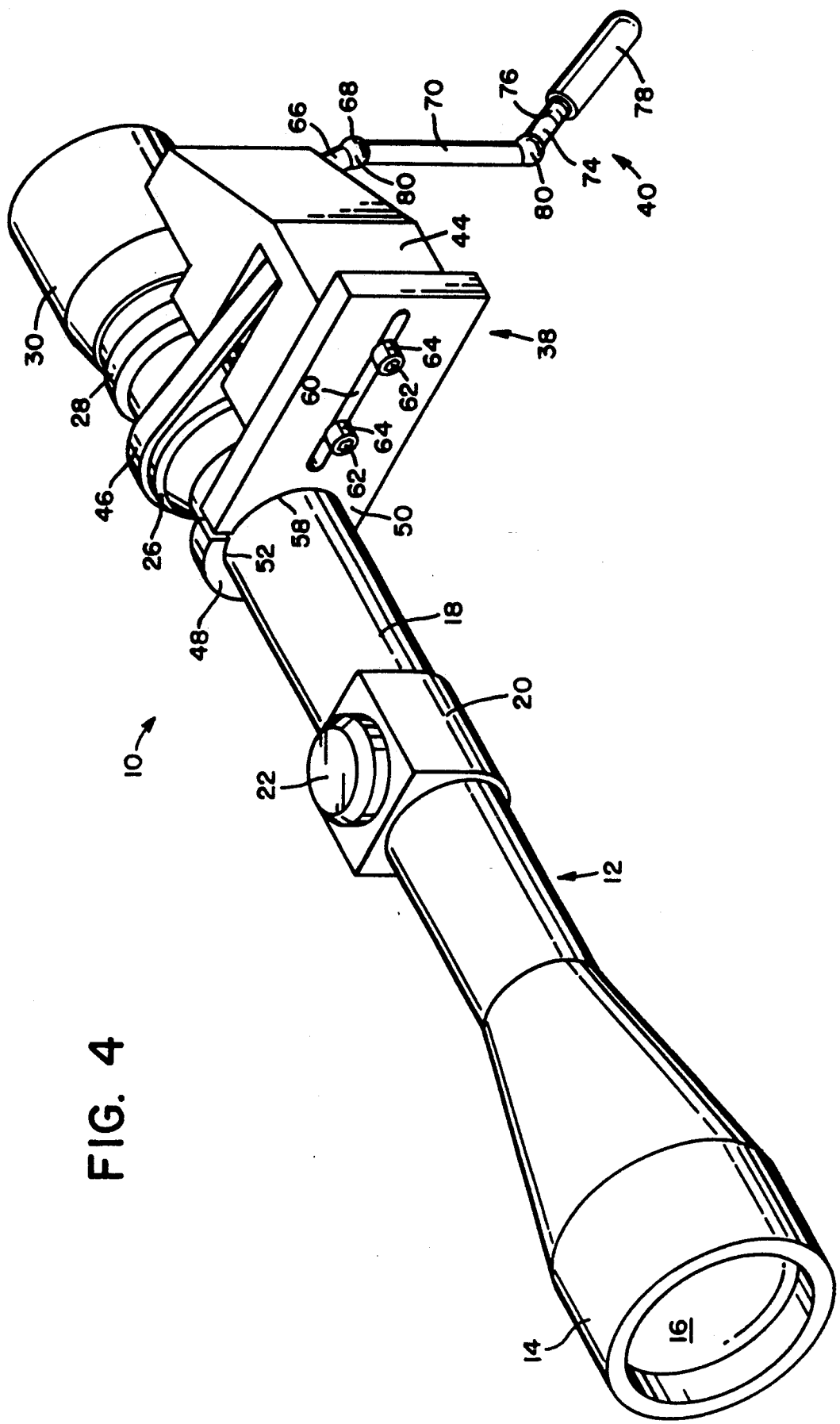
FIG. 4 is a perspective view of the variable power scope arrangement.

Referring now specifically to the drawings, the thumb actuated system for adjusting the magnification of a variable power scope, generally designated as 10, is adapted to be mounted to a variable power scope 12.

As illustrated in FIGS. 1-4 and 7, the variable power scope includes an objective housing 14 containing an objective lens arrangement 16, an elongated main tube 18 containing a collective lens arrangement, an erector lens arrangement, and a reticle assembly including an elevation and windage turret 20 having elevation and windage adjustment knobs 22 and 24, respectively, a rotatably adjustable zoom lens arrangement 26, an eyepiece locking ring 28, an ocular (eyepiece) housing 30 containing an ocular lens arrangement 32 and a mounting assembly 34 for securing the variable power scope to a rifle 36.

The thumb actuated system 10 for adjusting the magnification of the variable power scope 12 includes an adjustable clamp 38 for securing the system to the main tube 18 of the scope proximate the rotatably adjustable zoom lens arrangement 26, a thumb actuated multipositional lever assembly 40, a gearing system 42 contained within a protective housing 44 for converting the thumb actuated movement of the multipositional lever assembly into a rotational force and a belt system 46 for applying the rotational force produced by the gearing system to the rotatably adjustable zoom lens arrangement 26, thereby adjusting the magnification of the variable power scope.

Figure 6:
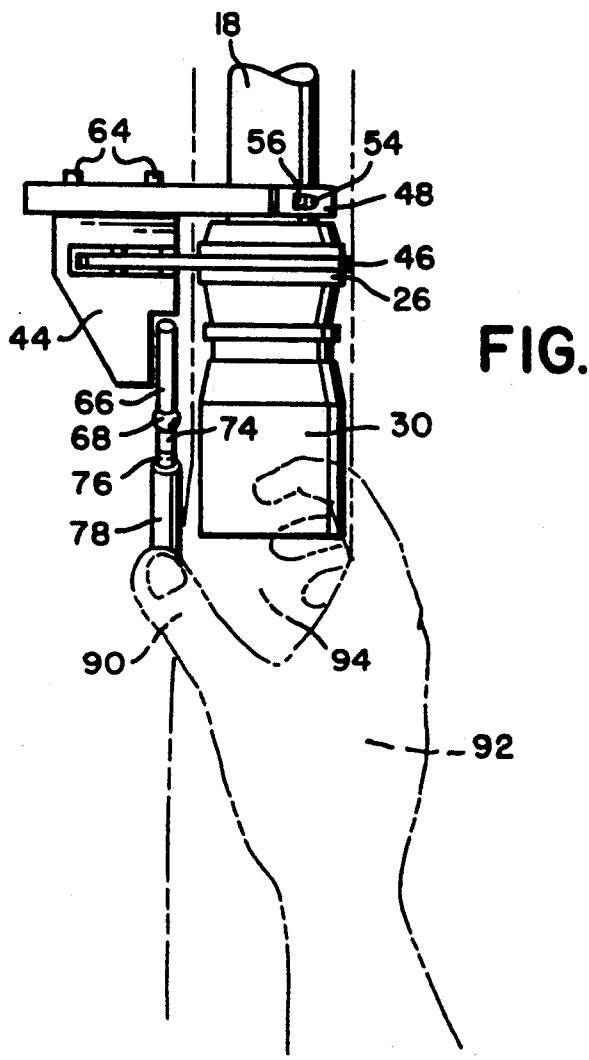
FIG. 6 is a partial plan view of a rifle with the variable power scope arrangement of the present invention mounted thereon wherein a shooter's trigger hand is in the shooting position with the thumb of the trigger hand actuating the multipositional lever.

The adjustable clamp 38 includes a two piece clamping plate which is adapted to be retrofitted onto the main tube of the variable power scope. As illustrated in FIGS. 1, 4 and 6, the adjustable clamp 38 includes first and second sections 48 and 50, respectively, which are removably securable about opposing sides of the main tube proximate the rotatably adjustable zoom lens arrangement 26. The first section 48 of the clamping plate includes a first substantially semicircular concavity 52 and a plurality of apertures 54 for receiving fastening hardware 56. The second section 50 of the clamping plate includes a corresponding number of apertures (not shown) for accepting the fastening hardware 56 after it has been inserted through the apertures 54, a second similarly shaped concavity 58 and an elongated channel 60 for adjustably receiving a plurality of mounting bolts 62 which are connected to the protective housing 44 of the gearing system. In addition, connecting hardware 64 is provided to fixedly secure the mounting bolts 62 within the elongated channel 60 after the protective housing has been correctly positioned according to the specific configuration of the variable power scope.

The multipositional lever assembly 40 includes a first lever section 66 which is operatively connected to the gearing system 42, a first ball joint 68 for pivotally attaching a second lever section 70 to the first lever section and a second ball joint 72 for pivotally attaching the second lever section to a third length adjustable lever section 74 having a threaded end portion 76 for adjustably receiving a rotatable thumb receiving element 78. In addition, each of the ball joints 68, 72 include a locking screw 80 for securely fastening the first, second and third lever sections into a desired configuration, thereby forming a single rigid lever assembly.

Referring now to FIG. 5, there is illustrated the gearing system 42 according to the preferred embodiment of the invention. The gearing system includes a first rotatable gear member 82 having a plurality of teeth 84 along the outer circumference thereof and a second perpendicularly oriented rotatable gear/pulley member 86 including a plurality of teeth 88 disposed on the side thereof which are adapted to be engaged by the teeth 84 on gear member 82. In operation, the first gear member 82 rotates about an axis substantially perpendicular to the longitudinal axis of the scope in response to the thumb actuated movement of the multipositional lever assembly 40, thereby rotating both the gear/pulley member 86 and the attached belt system 46 about an axis substantially parallel to the longitudinal axis of the scope.

As illustrated in the accompanying drawings, the belt system 46 encircles the combination of the gear/pulley member 86 and the rotatably adjustable zoom lens arrangement 26. Consequently, the rotational force produced by the gearing system 42 is directly coupled to the zoom lens arrangement 26, thereby adjusting the magnification of the variable power scope. In the preferred embodiment of the invention, the gearing and belt systems are adapted to translate the downward thumb actuated movement of the multipositional lever assembly 40 into a counter-clockwise rotation of the zoom lens arrangement, which results in an increase of the magnification provided by the variable power scope 12. Analogously, the upward thumb actuated movement of the multipositional lever assembly results in the clockwise rotation of the zoom lens arrangement and a decrease in the magnification provided by the variable power scope. Alternatively, the gearing system may be designed to reduce the magnification of the scope in response to the downward movement of the lever 40 and to increase the magnification in response to the upward movement thereof.

Figure 7:
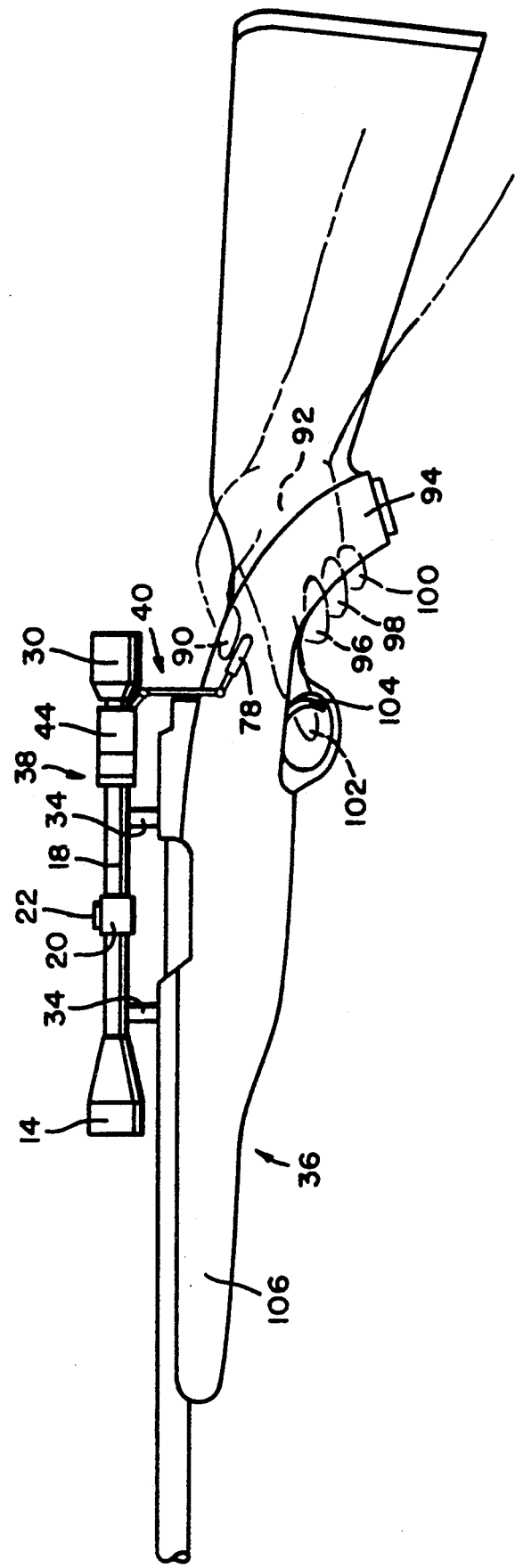
FIG. 7 is a side elevational view of a rifle with the variable power scope arrangement of the present invention mounted thereon.

As illustrated in FIGS. 6-7, the thumb receiving element 78 is adapted to be positioned proximate the shooting position of the thumb 90 of a shooter's trigger hand 92 by adjusting the relative orientation of the lever sections 66, 70, 74 and, if required, by rotating the thumb receiving element 78, thereby adjusting the length of the third length adjustable lever section. In the shooting position, the thumb 90 of the trigger hand is generally wrapped over the top of the pistol grip 94, the middle, ring, and pinkie fingers 96, 98 and 100, respectively, are wrapped around the pistol grip and the index finger 102 is placed on the trigger 104. Similarly, the other hand of the shooter (not shown) is utilized to support the forearm of the rifle 106. In operation, according to the preferred embodiment of the invention, the magnification of the variable power scope 12 may be increased by pressing the thumb 90 of the trigger hand downward against the thumb receiving element 78, thereby rotating the belt system 46 and the zoom lens assembly 26 in a counterclockwise direction. Correspondingly, the magnification of the scope may be decreased by forcing the thumb receiving element 78 upwards with the thumb 90, thereby rotating the belt system 46 and the zoom lens assembly in a clockwise direction.

Figure 8:
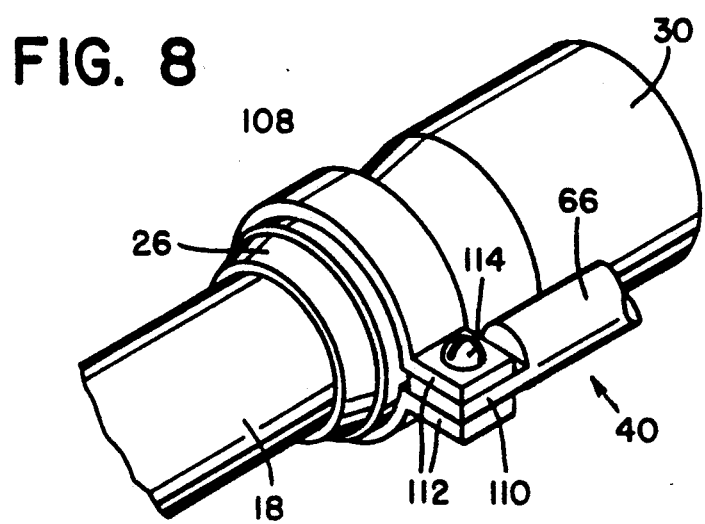
FIG. 8 illustrates a variable power scope arrangement according to an alternative embodiment of the invention.

An alternate embodiment of the invention which does not require the belt system 46 or gearing system 42 is illustrated in FIG. 8. In this embodiment, the multipositional lever assembly 40 is fastened to a circular clamp 108 which encircles the adjustable zoom lens arrangement 26. In particular, a flattened end portion 110 of the lever assembly 40 is secured intermediate two flat clamping plates 112 with a screw 114 or other suitable hardware. After the thumb receiving element 78 has been positioned according to the shooting position of the thumb of a shooter's trigger hand, the magnification of the variable power scope may be adjusted in response to the thumb actuated lateral movement of the lever assembly 40.

The foregoing description of the preferred embodiments of the invention has been presented for purposes of illustration and description. It is not intended to be exhaustive or to limit the invention to the precise form disclosed, and obviously many modifications and variations are possible in light of the above teaching. Such modifications and variations that may be apparent to a person skilled in the art are intended to be included within the scope of this invention as defined by the accompanying claims.

I claim:

1. An apparatus for adjusting the magnification of a variable power scope mounted on a rifle, said scope including a rotatably adjustable zoom lens arrangement, comprising:

means for receiving the thumb of a shooter's trigger hand while said rifle is held in a shooting position, said thumb receiving means adapted to move in response to thumb actuated pressure applied thereto, said rifle including a pistol grip which is grasped by the trigger hand of said shooter when said rifle is held in said shooting position;

a multipositional lever assembly for adjustably positioning said thumb receiving means adjacent the pistol grip of said rifle, wherein said receiving means is adapted to receive the thumb of said trigger hand without removing said hand from the pistol grip of said rifle;

means for rotating said rotatably adjustable zoom lens arrangement; and means for coupling said thumb receiving means and said means for rotating said rotatably adjustable zoom lens arrangement, wherein said lens arrangement is adapted to rotate in response to the thumb actuated movement of said thumb receiving means, thereby adjusting the magnification of said variable power scope without removing the rifle from the shooting position.

2. The apparatus of claim 1 wherein said receiving means is adapted to receive the thumb of said shooter when said rifle is held in a right or left handed shooting position.

3. The apparatus of claim 1 wherein said variable power scope includes a housing, and wherein said apparatus further includes means for adjustably mounting said apparatus to the housing of said scope.

4. The apparatus of claim 1 wherein said means for coupling said thumb receiving means and said rotating means includes:

means for producing a rotational force in response to the movement of said thumb receiving means.

5. The apparatus of claim 4 wherein said means for rotating includes:

means for applying said rotational force to said rotatably adjustable zoom lens arrangement.

6. An apparatus for adjusting the magnification of a variable power scope mounted on a rifle, said scope including a rotatably adjustable zoom lens arrangement, comprising:

means for receiving the thumb of a shooter's trigger hand while said rifle is held in a shooting position, said thumb receiving means adapted to move in response to thumb actuated pressure applied thereto, said rifle including a pistol grip which is grasped by the trigger hand of said shooter when said rifle is held in said shooting position;

a lever assembly for adjustably positioning said thumb receiving means adjacent the pistol grip of said rifle, wherein said receiving means is adapted to receive the thumb of said trigger hand without removing said hand from the pistol grip of said rifle;

means for rotating said rotatably adjustable zoom lens arrangement; and means for coupling said thumb receiving means and said means for rotating said rotatably adjustable zoom lens arrangement, wherein said lens arrangement is adapted to rotate in response to the thumb actuated movement of said thumb receiving means, thereby adjusting the magnification of said variable power scope without removing the rifle from the shooting position.

7. The apparatus of claim 6 wherein said receiving means is adapted to receive the thumb of said shooter when said rifle is held in a right or left handed shooting position.

8. The apparatus of claim 6 wherein said variable power scope includes a housing, and wherein said apparatus further includes means for adjustably mounting said apparatus to the housing of said scope.

9. The apparatus of claim 6 wherein said means for coupling said thumb receiving means and said rotating means includes:

means for producing a rotational force in response to the movement of said thumb receiving means.

10. The apparatus according to claim 9 wherein said means for rotating includes:

means for applying said rotational force to said rotatably adjustable zoom lens arrangement.

* * * * *